(12) United States Patent
DeCusatis et al.

(10) Patent No.: US 9,769,074 B2
(45) Date of Patent: Sep. 19, 2017

(54) NETWORK PER-FLOW RATE LIMITING

(71) Applicant: International Business Machines Corporation, Armonk, NY (US)

(72) Inventors: Casimer DeCusatis, Poughkeepsie, NY (US); Rajaram B. Krishnamurthy, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 13/833,886

(22) Filed: Mar. 15, 2013

(65) Prior Publication Data

US 2014/0269319 A1 Sep. 18, 2014

(51) Int. Cl.
*H04L 12/26* (2006.01)
*H04L 12/801* (2013.01)

(52) U.S. Cl.
CPC .......... *H04L 47/12* (2013.01); *H04L 43/0882* (2013.01)

(58) Field of Classification Search
None
See application file for complete search history.

(56) References Cited

U.S. PATENT DOCUMENTS

| 5,694,390 A | 12/1997 | Yamato |
| 5,905,711 A | 5/1999 | Chiussi |
| 5,966,546 A | 10/1999 | Thomas |
| 6,094,418 A | 7/2000 | Soumiya et al. |
| 6,208,619 B1 | 3/2001 | Takeuchi |
| 6,356,944 B1 | 3/2002 | McCarty |
| 6,504,818 B1 | 1/2003 | Levine |

(Continued)

FOREIGN PATENT DOCUMENTS

| CN | 101313278 A | 11/2008 |
| CN | 101335710 A | 12/2008 |

(Continued)

OTHER PUBLICATIONS

Notification of Transmittal of the International Search Report and the Written Opinion of the International Searching Authority, or the Declaration; PCT/IB2014/059457; Mailed Jul. 1, 2014, 6 pages.

(Continued)

*Primary Examiner* — Christopher Crutchfield
*Assistant Examiner* — Alan Lindenbaum
(74) *Attorney, Agent, or Firm* — Cantor Colburn LLP; Steven Chiu

(57) ABSTRACT

A method of monitoring data flow in a network is provided. The method includes: configuring a data flow including a plurality of data packets by a switch controller, the switch controller configured to control routing through the switch and switch configuration, wherein configuring includes storing an indication of a flow control policy in one or more of the data packets; monitoring a network switch receiving the data flow, wherein monitoring includes determining flow statistics in the switch; determining whether a congestion condition exists for the data flow based on the flow statistics and the flow control policy; and based on determining that the congestion condition exists for the data flow, performing a remedial action specific to the data flow to address the congestion condition.

24 Claims, 5 Drawing Sheets

(56) References Cited

U.S. PATENT DOCUMENTS

| | | |
|---|---|---|
| 6,504,821 B2 | 1/2003 | Berger |
| 6,795,399 B1 | 9/2004 | Benmohamed et al. |
| 6,813,246 B1 | 11/2004 | Phan et al. |
| 6,947,380 B1 | 9/2005 | Yip et al. |
| 6,975,592 B1 | 12/2005 | Seddigh |
| 7,187,652 B2 | 3/2007 | Lee et al. |
| 7,234,073 B1 | 6/2007 | Roytman et al. |
| 7,289,453 B2 | 10/2007 | Riedel et al. |
| 7,408,876 B1 | 8/2008 | Gupta |
| 7,765,328 B2 | 7/2010 | Bryers et al. |
| 7,949,893 B1 | 5/2011 | Knaus et al. |
| 7,978,607 B1 | 7/2011 | Halabi et al. |
| 8,069,139 B2 | 11/2011 | Garbow et al. |
| 8,082,466 B2 | 12/2011 | Tanaka et al. |
| 8,429,282 B1 | 4/2013 | Ahuja |
| 8,630,307 B2 | 1/2014 | Wu et al. |
| 8,724,470 B2 | 5/2014 | Yi et al. |
| 8,762,501 B2 | 6/2014 | Kempf |
| 8,953,453 B1 | 2/2015 | Xiao et al. |
| 2001/0056459 A1 | 12/2001 | Kurose |
| 2002/0073354 A1 | 6/2002 | Schroiff et al. |
| 2002/0159386 A1 | 10/2002 | Grosdidier et al. |
| 2002/0181484 A1 | 12/2002 | Aimoto |
| 2002/0196749 A1 | 12/2002 | Eyuboglu et al. |
| 2003/0051187 A1 | 3/2003 | Mashayekhi et al. |
| 2004/0153866 A1 | 8/2004 | Guimbellot et al. |
| 2004/0170123 A1 | 9/2004 | Carpenter et al. |
| 2004/0179476 A1 | 9/2004 | Kim et al. |
| 2004/0199609 A1 | 10/2004 | Papatla et al. |
| 2004/0228278 A1 | 11/2004 | Bruckman et al. |
| 2006/0126509 A1 | 6/2006 | Abi-Nassif et al. |
| 2006/0187874 A1 | 8/2006 | Zaki |
| 2006/0203828 A1 | 9/2006 | Kumazawa |
| 2006/0209695 A1 | 9/2006 | Archer et al. |
| 2006/0215550 A1 | 9/2006 | Malhotra |
| 2007/0081454 A1 | 4/2007 | Bergamasco et al. |
| 2007/0183332 A1 | 8/2007 | Oh |
| 2007/0204266 A1 | 8/2007 | Beaty et al. |
| 2007/0220121 A1 | 9/2007 | Suwarna |
| 2007/0263540 A1 | 11/2007 | Charzinski et al. |
| 2008/0137669 A1 | 6/2008 | Balandina et al. |
| 2008/0192752 A1 | 8/2008 | Hyslop et al. |
| 2008/0225713 A1 | 9/2008 | Tychon et al. |
| 2008/0298248 A1 | 12/2008 | Roeck et al. |
| 2009/0052326 A1 | 2/2009 | Bergamasco et al. |
| 2009/0089609 A1 | 4/2009 | Baba |
| 2009/0092046 A1 | 4/2009 | Naven |
| 2009/0180380 A1 | 7/2009 | Prabhakar et al. |
| 2009/0203350 A1 | 8/2009 | Gottlieb |
| 2009/0213861 A1 | 8/2009 | Benner et al. |
| 2009/0231997 A1 | 9/2009 | Yang et al. |
| 2009/0232001 A1 | 9/2009 | Gong et al. |
| 2009/0268614 A1 | 10/2009 | Tay |
| 2010/0014487 A1 | 1/2010 | Attar et al. |
| 2010/0027420 A1 | 2/2010 | Smith |
| 2010/0027424 A1 | 2/2010 | Radunovic et al. |
| 2010/0138686 A1 | 6/2010 | Arata et al. |
| 2010/0142539 A1 | 6/2010 | Gooch |
| 2010/0146327 A1 | 6/2010 | Takubo |
| 2010/0166424 A1 | 7/2010 | Nagarajan et al. |
| 2010/0199275 A1 | 8/2010 | Mudigonda et al. |
| 2010/0211718 A1 | 8/2010 | Gratz |
| 2010/0214970 A1 | 8/2010 | Brunner et al. |
| 2010/0238803 A1 | 9/2010 | Racz et al. |
| 2010/0238805 A1 | 9/2010 | Ludwig et al. |
| 2010/0281178 A1 | 11/2010 | Sullivan |
| 2010/0302935 A1 | 12/2010 | Zhang et al. |
| 2010/0303238 A1 | 12/2010 | Cakulev |
| 2010/0309781 A1 | 12/2010 | Wang et al. |
| 2011/0026437 A1 | 2/2011 | Roja-Cessa et al. |
| 2011/0031082 A1 | 2/2011 | Chi |
| 2011/0032821 A1 | 2/2011 | Morrill et al. |
| 2011/0085444 A1 | 4/2011 | Ko et al. |
| 2011/0090797 A1 | 4/2011 | Beecroft |
| 2011/0135305 A1 | 6/2011 | Barnard |
| 2011/0137772 A1 | 6/2011 | Davis, III et al. |
| 2011/0142450 A1 | 6/2011 | Tanzi et al. |
| 2011/0158647 A1 | 6/2011 | Solheim et al. |
| 2011/0158658 A1 | 6/2011 | Myslinski et al. |
| 2011/0179415 A1 | 7/2011 | Donnellan et al. |
| 2011/0206025 A1 | 8/2011 | Cadenas Gonzalez et al. |
| 2011/0211834 A1 | 9/2011 | Ansari et al. |
| 2011/0242966 A1 | 10/2011 | Van Caenegem |
| 2011/0256865 A1 | 10/2011 | Sayeed |
| 2011/0261696 A1 | 10/2011 | Crisan et al. |
| 2011/0261831 A1 | 10/2011 | Sharma et al. |
| 2011/0271007 A1 | 11/2011 | Wang et al. |
| 2011/0273988 A1 | 11/2011 | Tourrilhes et al. |
| 2011/0283016 A1 | 11/2011 | Uchida |
| 2011/0286324 A1 | 11/2011 | Bellagamba et al. |
| 2011/0292830 A1 | 12/2011 | Yanggratoke et al. |
| 2011/0295996 A1 | 12/2011 | Qiu |
| 2011/0299389 A1 | 12/2011 | Mau et al. |
| 2011/0305167 A1 | 12/2011 | Koide |
| 2011/0305288 A1 | 12/2011 | Liu et al. |
| 2012/0008958 A1 | 1/2012 | Dahlfort et al. |
| 2012/0014284 A1 | 1/2012 | Ranganathan et al. |
| 2012/0014693 A1 | 1/2012 | Cheng et al. |
| 2012/0020361 A1 | 1/2012 | Ueno |
| 2012/0023231 A1 | 1/2012 | Ueno |
| 2012/0030306 A1 | 2/2012 | Kami |
| 2012/0054079 A1 | 3/2012 | Hayashi |
| 2012/0063316 A1 | 3/2012 | Ghanwani et al. |
| 2012/0163175 A1 | 6/2012 | Gupta et al. |
| 2012/0170477 A1 | 7/2012 | Hieda |
| 2012/0195201 A1* | 8/2012 | Ishikawa .................... 370/235.1 |
| 2012/0201140 A1 | 8/2012 | Suzuki |
| 2012/0207175 A1 | 8/2012 | Raman et al. |
| 2012/0221887 A1 | 8/2012 | Hansson et al. |
| 2012/0243476 A1 | 9/2012 | Eyuboglu |
| 2012/0250496 A1 | 10/2012 | Kato |
| 2012/0287782 A1 | 11/2012 | Lv et al. |
| 2013/0003735 A1 | 1/2013 | Chao |
| 2013/0010600 A1 | 1/2013 | Jocha et al. |
| 2013/0054761 A1 | 2/2013 | Kempf et al. |
| 2013/0058345 A1 | 3/2013 | Kano |
| 2013/0124683 A1 | 5/2013 | Watanabe |
| 2013/0144995 A1 | 6/2013 | Ishii |
| 2013/0159415 A1 | 6/2013 | Kamiya et al. |
| 2013/0162038 A1 | 6/2013 | Falk et al. |
| 2013/0176850 A1 | 7/2013 | Mishra |
| 2013/0205002 A1 | 8/2013 | Wang et al. |
| 2013/0212578 A1 | 8/2013 | Garg et al. |
| 2013/0250770 A1 | 9/2013 | Zou et al. |
| 2013/0258843 A1 | 10/2013 | Kurita |
| 2013/0258847 A1* | 10/2013 | Zhang et al. .................. 370/232 |
| 2013/0266317 A1 | 10/2013 | Wang |
| 2013/0268686 A1 | 10/2013 | Wang et al. |
| 2013/0294236 A1 | 11/2013 | Beheshti-Zavareh et al. |
| 2014/0006630 A1 | 1/2014 | Cai |
| 2014/0010235 A1 | 1/2014 | Ueno |
| 2014/0016476 A1 | 1/2014 | Dietz |
| 2014/0016647 A1 | 1/2014 | Yoshida et al. |
| 2014/0040526 A1 | 2/2014 | Chang et al. |
| 2014/0092907 A1 | 4/2014 | Sridhar et al. |
| 2014/0108632 A1 | 4/2014 | Narasimha |
| 2014/0119193 A1 | 5/2014 | Anand et al. |
| 2014/0126907 A1 | 5/2014 | Hirth et al. |
| 2014/0169189 A1 | 6/2014 | Kalunnte |
| 2014/0178066 A1 | 6/2014 | Patel et al. |
| 2014/0192646 A1 | 7/2014 | Mir |
| 2014/0198648 A1* | 7/2014 | Kulkarni ............. H04L 47/2441 370/235 |
| 2014/0258774 A1 | 9/2014 | Taylor et al. |
| 2014/0301204 A1 | 10/2014 | Koshimizu |

FOREIGN PATENT DOCUMENTS

| | | |
|---|---|---|
| CN | 101398770 A | 4/2009 |
| CN | 101663590 A | 2/2010 |
| CN | 101677321 A | 3/2010 |
| CN | 101997644 A | 3/2011 |
| CN | 102291389 A | 12/2011 |
| CN | 102546385 A | 7/2012 |

(56) References Cited

FOREIGN PATENT DOCUMENTS

| | | |
|---|---|---|
| CN | 102611612 A | 7/2012 |
| EP | 0876023 | 11/1998 |
| GB | 2313268 A | 5/1996 |
| JP | 2011166700 A | 8/2011 |
| WO | 9930462 | 6/1999 |
| WO | 2009113106 A2 | 9/2009 |
| WO | 2011037104 A1 | 9/2010 |
| WO | 2011037148 A1 | 3/2011 |
| WO | 2011065268 A1 | 3/2011 |
| WO | 2011118575 A1 | 9/2011 |
| WO | 2012056816 A | 5/2012 |

OTHER PUBLICATIONS

Egilmez, et al. "Scalable video streaming over OpenFlow networks: An optimization framework for QoS Routing". 2011 18th IEEE International Confernece on Image Processing (ICIP), 2241-2244.

El-Azzab, et al. "Slices isolator for a virtualized openflow node", (2011) First International Symposium on Network Cloud Computing and Applications (NCCA), 121-126.

Curtis, et al. "DevoFlow: Scaling Flow Management for High-Performance Netowrks". SIGCOMM'11, Aug. 15-19, 2011, Toronto, Ontario, Canada.

Li, Z., et al. Compatib le TDM/WDM PON using a Single Tunable Optical Filter for both Downstream Wavelength Selection and Upstream Wavelength Generation. IEEE Photonics Technology Letters, vol. 24, No. 10, May 15, 2012. pp. 797-799.

Liu, et al. "Open Flow-based Wavelength Path Control in Transparent Optical networks: a Proof-of-Concept Demonstration" Sep. 2011, 37th European conference and Exhibition on Optical communication (ECOC).

McKeown et al., "OpenFlow: Enabling Innovation in Campus Networks", Mar. 14, 2008, 6 pages.

McKeown, et al. "OpenFlow: Enabling Innovation in Campus Networks". ACM SIGCOMM Computer Communication Review, 38(2), 69-74.

Johnson, RD.et al.; "Detection of a Working Master Controller by a Slave Card"; http://www.ip.com/pubview/IPCOM000099594D; Feb. 1, 1990, 3 pages.

IBM "Software Defined Networking, a new paradigm for virtual dynamic, flexible networking," IBM Systems and Technology, Oct. 2012, 6 pages.

Anonymous; "Intelligent VM Migration Based on Relative VM Priority and Relative Suitability of Migration Target"; http://priorartdatabase.com/IPCOM/000201632; Nov. 16, 2010, 3 pages.

Anonymous; "Management framework for efficient live migration of virtual machines running migration-aware applications";http://priorartdatabase.com/IPCOM000200260; Oct. 3, 2010, 5 pages.

Pfaff, B.et al.; "Open Flow Switch Specification"; www.openflow.org/document/openflow_spec_v1.0.0.pdf; Feb. 28, 2011, 56 pages.

IBM; "The automatic determination of master-slave relationship between embedded controllers by mearns of a shared hardware access switch"; http://www.ip.com/pubview/IPCOM000020741D; Dec. 11, 2003, 5 pages.

Wang et al., "Dynamic Bandwidth Allocation for Preventing Congestion in Data Center Networks," ISNN 2011, Part III, LNCS 6677, pp. 160-167, 2011.

Yong, S. et al, "XOR Retransmission in Multicast Error Recovery". Networks, 2000 (ICON2000). Proceedings. IEEE International Conference. pp. 336-340.

PCT Notification of Transmittal of the International Search Report and the Written Opinion of the International Searching Authority, or the Declaration, Application No. PCT/IB2014/059460; International Filing Date: Mar. 5, 2014; Date of Mailing: Jun. 30, 2014; 9 pages.

PCT Notification of Transmittal of the International Search Report and the Written Opinion of the International Searching Authority, or the Declaration, Application No. PCT/IB2014/059459; International Filing Date: Mar. 5, 2014; Date of Mailing: Jun. 30, 2014; 10 pages.

U.S. Appl. No. 13/833,796; Non-final Office Action ; filed Mar. 15, 2013; Date Mailed: Dec. 19, 2014; 31pages.

U.S. Appl. No. 13/834,117; Non-Final Office Action; filed Mar. 15, 2013; Date Mailed: Feb. 26, 2015, 61 pages.

U.S. Appl. No. 13/834,502; Non-Final Office Action; filed Mar. 15, 2013; Date Mailed: Dec. 4, 2014; 37 pages.

U.S. Appl. No. 14/501,663; Non-Final Office Action; filed Sep. 30, 2014; Date Mailed: Dec. 19, 2014; 11 pages.

U.S. Appl. No. 14/501,945; Non-Final Office Action, filed Sep. 30, 2014; Date Mailed: Jan. 5, 2015; 29 pages.

U.S. Appl. No. 14/502,043; Non-Final Office Action; filed Sep. 30, 2014; Date Mailed: Dec. 23, 2014; 17 pages.

U.S. Appl. No. 13/833,952; Non-Final Office Action; filed Mar. 15, 2013; Date Mailed: Nov. 3, 2014; 39 pages.

U.S. Appl. No. 13/833,952, Final Office Action; filed Mar. 15, 2013; Date Mailed: Apr. 16, 2015; 25 pages.

U.S. Appl. No. 14/501,663, filed Sep. 30, 2014; Final Office Action; Date Mailed: Apr. 9, 2015; 25 pages.

U.S. Appl. No. 13/834,502; Final Office Action; filed Mar. 15, 2013; Date Mailed: Jun. 29, 2015; 26 pages.

U.S. Appl. No. 14/501,457; Final Office Action; filed Sep. 30, 2014; Date Mailed: Jun. 29, 2015; 28 pages.

U.S. Appl. No. 13/833,952; Non-Final Office Action, filed Mar. 15, 2013; Date Mailed: Aug. 5, 2015; 25 pages.

U.S. Appl. No. 14/501,945; Final Office Action: filed Sep. 30, 2014; Date Mailed: Jul. 16, 2015; 30 pages.

U.S. Appl. No. 13/833,796; filed Mar. 15, 2013; Non-Final Office Action; Date Mailed: Jul. 30, 2015, 21 pages.

U.S. Appl. No. 13/834,117; filed Mar. 15, 2013; Final Office Action; Date Mailed: Jul. 17, 2015, 31 pages.

U.S. Appl. No. 13/833,796, filed Mar. 15, 2013; Final office action; Date Mailed: Jan. 15, 2016; 18 pages.

U.S. Appl. No. 13/834,117, filed Mar. 15, 2013; Non-final office Action; Date Mailed: Dec. 16, 2015; 30 pages.

U.S. Appl. No. 14/501,663, filed Sep. 30, 2014; Final office action; Date Mailed: Jan. 20, 2016; 15 pages.

U.S. Appl. No. 14/501,945; Non-final Office Action; filed Sep. 30, 2014; Date Mailed: Nov. 30, 2015; 22 pages.

* cited by examiner

NETWORK PER-FLOW RATE LIMITING

BACKGROUND

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

Network congestion is a problem that occurs when the data flow is received from a source at a faster rate than the flow can be outputted or routed. Such congestion results in a reduction of quality of service, causing packets to be dropped, or queuing and/or transmission of packets to be delayed.

SUMMARY

According to an embodiment, a method of monitoring data flow in a network is provided. The method includes: configuring a data flow including a plurality of data packets by a switch controller, the switch controller configured to control routing through the switch and switch configuration, wherein configuring includes storing an indication of a flow control policy in one or more of the data packets; monitoring a network switch receiving the data flow, wherein monitoring includes determining flow statistics in the switch; determining whether a congestion condition exists for the data flow based on the flow statistics and the flow control policy; and based on determining that the congestion condition exists for the data flow, performing a remedial action specific to the data flow to address the congestion condition.

According to an embodiment, a method of processing data flows in a network switch is provided. The method includes: receiving a data flow at the network switch, the data flow including a plurality of data packets, wherein one or more of the data packets includes an indication of a flow control policy specific to the data flow; storing the indication of the flow control policy in a flow control queue in the network switch, the flow control policy associated with a threshold for comparison to flow statistics for the data flow; and processing the data flow at the network switch according to instructions associated with the data flow and configured by a switch controller.

According to another embodiment, a computer program product for monitoring data flow in a network is provided. The computer program product includes a tangible storage medium readable by a processing circuit and storing instructions for execution by the processing circuit for performing a method including: configuring a data flow including a plurality of data packets by a switch controller, the switch controller configured to control routing through the switch and switch configuration, wherein configuring includes storing an indication of a flow control policy in one or more of the data packets; monitoring a network switch receiving the data flow, wherein monitoring includes determining flow statistics in the switch; determining whether a congestion condition exists for the data flow based on the flow statistics and the flow control policy; and based on determining that the congestion condition exists for the data flow, performing a remedial action specific to the data flow to address the congestion condition.

According to yet another embodiment, a computer program product for processing data flows in a network switch is provided. The computer program product includes a tangible storage medium readable by a processing circuit and storing instructions for execution by the processing circuit for performing a method including: receiving a data flow at the network switch, the data flow including a plurality of data packets, wherein one or more of the data packets includes an indication of a flow control policy specific to the data flow; storing the indication of the flow control policy in a flow control queue in the network switch, the flow control policy associated with a threshold for comparison to flow statistics for the data flow; and processing the data flow at the network switch according to instructions associated with the data flow and configured by a switch controller.

According to still another embodiment, an apparatus for controlling a network switch is provided. The apparatus includes a memory having computer readable computer instructions; and a processor for executing the computer readable instructions. The instructions are for: configuring a data flow including a plurality of data packets by a switch controller, the switch controller configured to control routing through the switch and switch configuration, wherein configuring includes storing an indication of a flow control policy in one or more of the data packets; monitoring a network switch receiving the data flow, wherein monitoring includes determining flow statistics in the switch; determining whether a congestion condition exists for the data flow based on the flow statistics and the flow control policy; and based on determining that the congestion condition exists for the data flow, performing a remedial action specific to the data flow to address the congestion condition.

Additional features and advantages are realized through the embodiments described herein. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to monitoring data flows processed in network switches. An embodiment of a network includes one or more switches, each connected to a network controller or switch controller configured to control the switch. In one embodiment, a plurality of network switches are connected to and controlled by a central switch controller. In one embodiment, the controller sends control data packets to the switch to effect various configurations and routing functions. In one embodiment, the controller is configured to incorporate flow control information such as Quality of Service (QoS) policies into data packets (e.g., in packet headers) of a data flow for use in monitoring specific flows as they are processed in a network switch. An exemplary method includes monitoring flow statistics for data flows in a network switch, and comparing the flow statistics to a threshold based on flow control information specific to each data flow. In one embodiment, the flow control information is stored in the switch in a flow control queue that includes indications of QoS policies associated with specific data flows.

Figure 1:
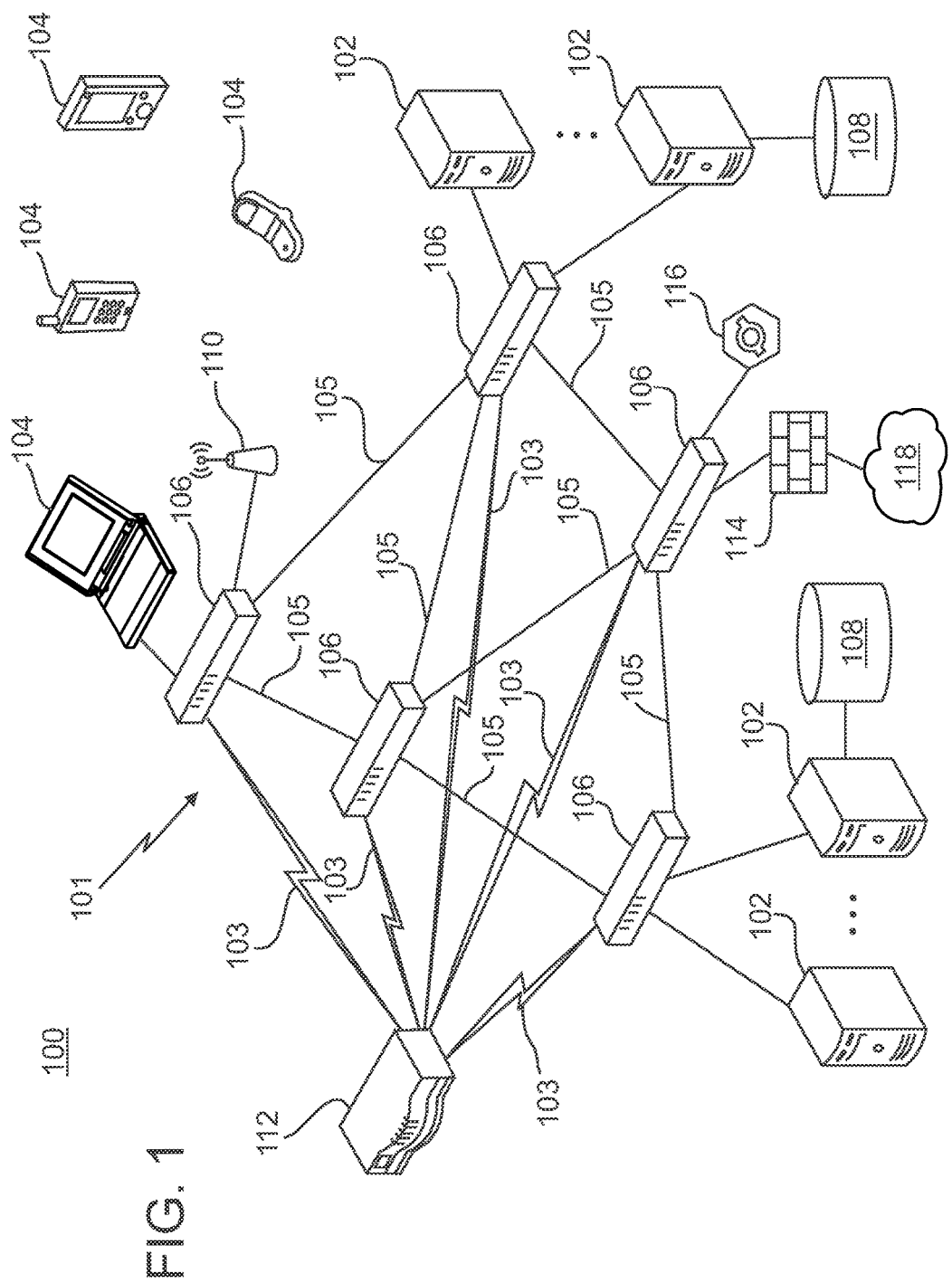
FIG. 1 depicts a block diagram of a system including a network with OpenFlow-capable switches that may be implemented according to an embodiment.

Turning now to FIG. 1, an example of a system 100 including a network 101 that supports OpenFlow will now be described in greater detail. In the example depicted in FIG. 1, the system 100 is a data center environment including a plurality of servers 102 and client systems 104 configured to communicate over the network 101 using switches 106 that are OpenFlow-capable. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may include one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes a network controller 112 that is a central software defined network controller configured to make routing decisions within the network 101. The network controller 112 establishes one or more secure links 103 to configure the switches 106 and establish communication properties of links 105 between the switches 106. For example, the network controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controller 112 can include various computer/communication hardware and software technology known in the art, such as one or more processing units or circuits, volatile and non-volatile memory including removable media, power supplies, network interfaces, support circuitry, operating systems, and the like. Although the network controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controller 112, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports OpenFlow as a layer-2 protocol. The switches 106 can be dedicated OpenFlow switches or OpenFlow-enabled general purpose switches that also support layer-2 and layer-3 Ethernet.

Figure 2:
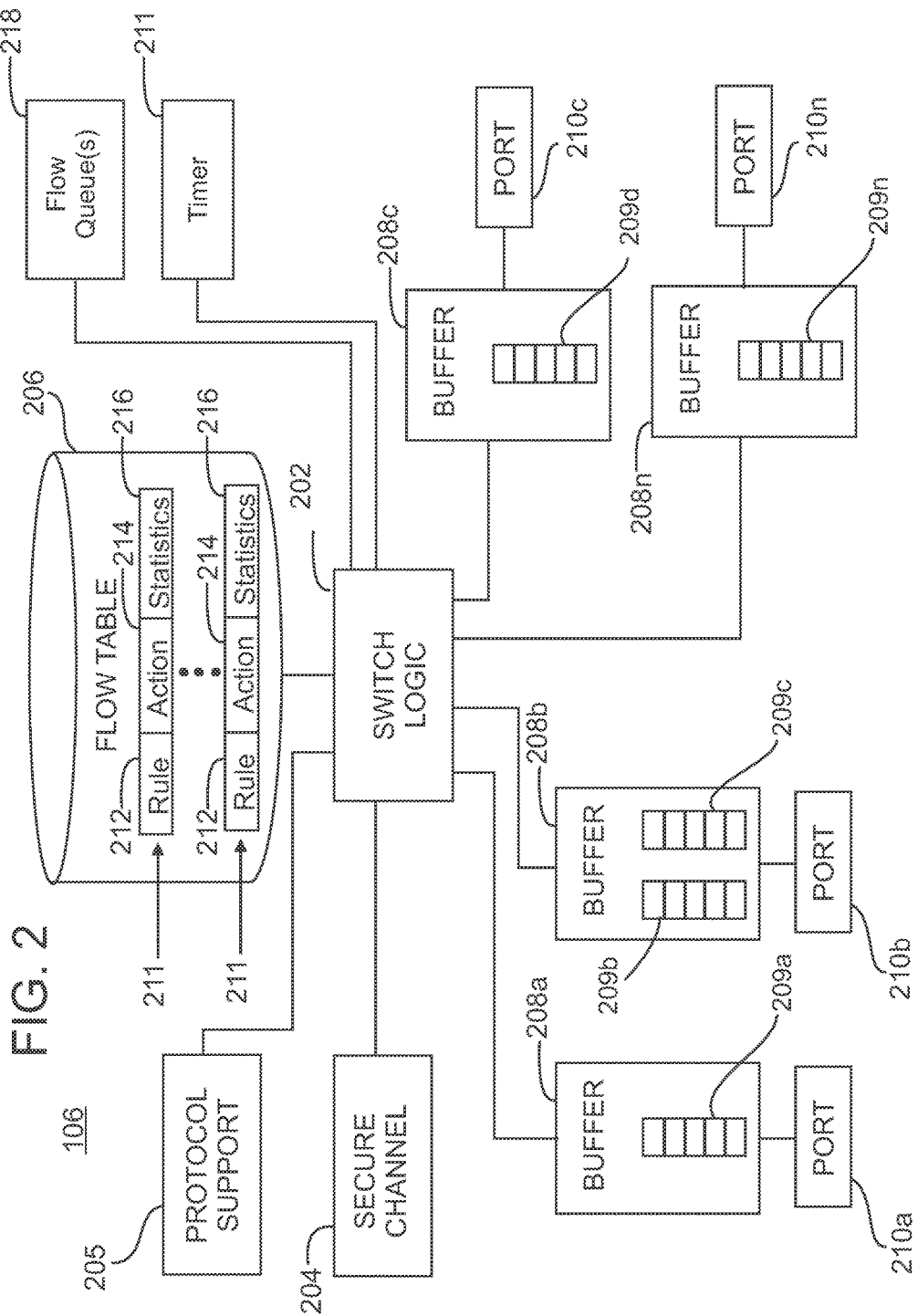
FIG. 2 depicts a block diagram of an OpenFlow-capable switch according to an embodiment.

FIG. 2 depicts a block diagram of the switch 106 of FIG. 1 that supports OpenFlow. The switch 106 includes switch logic 202, secure channel 204, protocol support 205, flow table 206, buffers 208a-208n including various queues 209a-209n, and ports 210a-210n. The switch 106 includes various counters or timers 211, such as timers associated with queues 209a-209n, the flow table 206 and/or flow table entries. The switch logic 202 may be implemented in one or more processing circuits, where a computer readable storage medium is configured to hold instructions for the switch logic 202, as well as various variables and constants to support operation of the switch 106. The switch logic 202 forwards packets between the ports 210a-210n as flows defined by the network controller 112 of FIG. 1.

The secure channel 204 connects the switch 106 to the network controller 112 of FIG. 1. The secure channel 204 allows commands and packets to be communicated between the network controller 112 and the switch 106 via the OpenFlow protocol. The secure channel 204 can be implemented in software as executable instructions stored within the switch 106. Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The flow table 206 defines supported connection types associated with particular addresses, virtual local area networks or switch ports, and is used by the switch to process data flows received at the switch. A data flow is a sequence of data packets grouped in some manner, e.g., by source and/or destination, or otherwise defined by selected criteria. Each data flow may be mapped to a port and associated queue based on the flow table 206. For example, a data flow is defined as all packets that match a particular header format.

Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the network controller 112 of FIG. 1, and dropping packets of the flow. Entries 211 in the flow table 206 can be added and removed by the network controller 112 of FIG. 1 via the secure channel 204. The network controller 112 of FIG. 1 can pre-populate the entries 211 in the flow table 206. Additionally, the switch 106 can request creation of an entry 211 from the network controller 112 upon receiving a flow without a corresponding entry 211 in the flow table 206.

The buffers 208a-208n provide temporary storage in queues 209a-209n for flows as packets are sent between the ports 210a-210n. In a lossless configuration, rather than dropping packets when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

For example, in an OpenFlow switch, each port 210a-210n is attached to a respective queue 209a-209n. In operation, when the switch 106 receives a packet, the switch 106 attempts to match the packet by comparing fields (referred to as "match fields") to corresponding fields in flow entries of each flow table 206. Exemplary match fields include ingress port and metadata fields, as well as header fields such as those described below in reference to FIG. 3. In one embodiment, matching starts at the first flow table and may continue to additional flow tables.

If no match is found, the switch 106 may perform an action based on the switch configuration, e.g., the packet may be forwarded to the controller or dropped. If the packet matches a flow entry in a flow table, the corresponding instruction set is executed based on the flow entry, e.g., the actions field 214. For example, when a packet is matched to a flow entry including an output action, the packet is forwarded to one of ports 210a-210n specified in the flow entry.

In one embodiment, forwarding the packet to a port includes mapping packets in a flow to a queue attached to the port. Such flows are treated according to the queue's configuration (e.g., minimum rate).

The switch 106 also includes one or more flow control queues 218 that include flow control information for each data flow received by the switch 106. The flow control information includes data representing a flow control setting or policy, such as a quality of service (QoS) policy. The QoS policy defines a level of flow control assigned to a respective data flow. For example, a data flow can be assigned a QoS policy specifying a minimum throughput (e.g., queue transmission rate), maximum queue depth, dropped packet rate, bit error rate, latency, jitter, etc. The flow control queue(s) 218 allow the switch 406 and/or controller 408 to individually monitor each data flow in the switch 406 and modify flow processing based on a QoS policy specific to each data flow, e.g., by throttling on/off specific flows or alerting the switch controller 408 to allow the flow to be re-routed, dropped or rate-limited.

The flow control queue 218 is not limited to the embodiments described herein. The flow control queue 218 may be embodied as any suitable data structure (e.g., a table) that allows the switch 106 and/or the controller to compare individual data flow metrics or statistics to a flow policy and modify flow processing therefrom. For example, flow queue(s) 218 may be embodied as a separate or additional (physical or virtual) queue, or as space allocated from an existing virtual queue.

Figure 3:
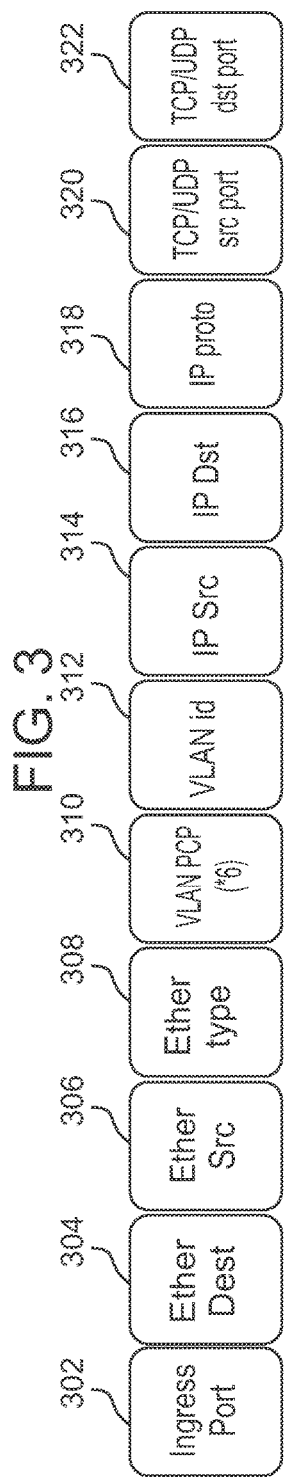
FIG. 3 depicts an example of an OpenFlow flow switching definition that can be used in embodiments.

FIG. 3 depicts an example of an OpenFlow flow switching definition 300 that can be used in embodiments. The OpenFlow flow switching definition 300 is a packet header that defines the flow and includes a number of fields. In this example, the switching definition 300 is a flow header that includes up to eleven tuples or fields; however, not all tuples need to be defined depending upon particular flows. In the example of FIG. 3, the OpenFlow flow switching definition 300 includes tuples for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, and a TCP/UDP destination port 322. The Ethernet destination address 304 may represent a layer-2 Ethernet hardware address or media access control (MAC) address used in legacy switching and routing. The IP destination address 316 may represent a layer-3 IP address used in legacy switching and routing. Flow switching can be defined for any combination of tuples in the OpenFlow flow switching definition 300, with a particular combination of tuples serving as a key. For example, flows can be defined in a rule 212 of FIG. 2 by exact matching or wildcard matching for aggregated MAC-subnets, IP-subnets, ports, VLAN identifiers, and the like.

Figure 4:
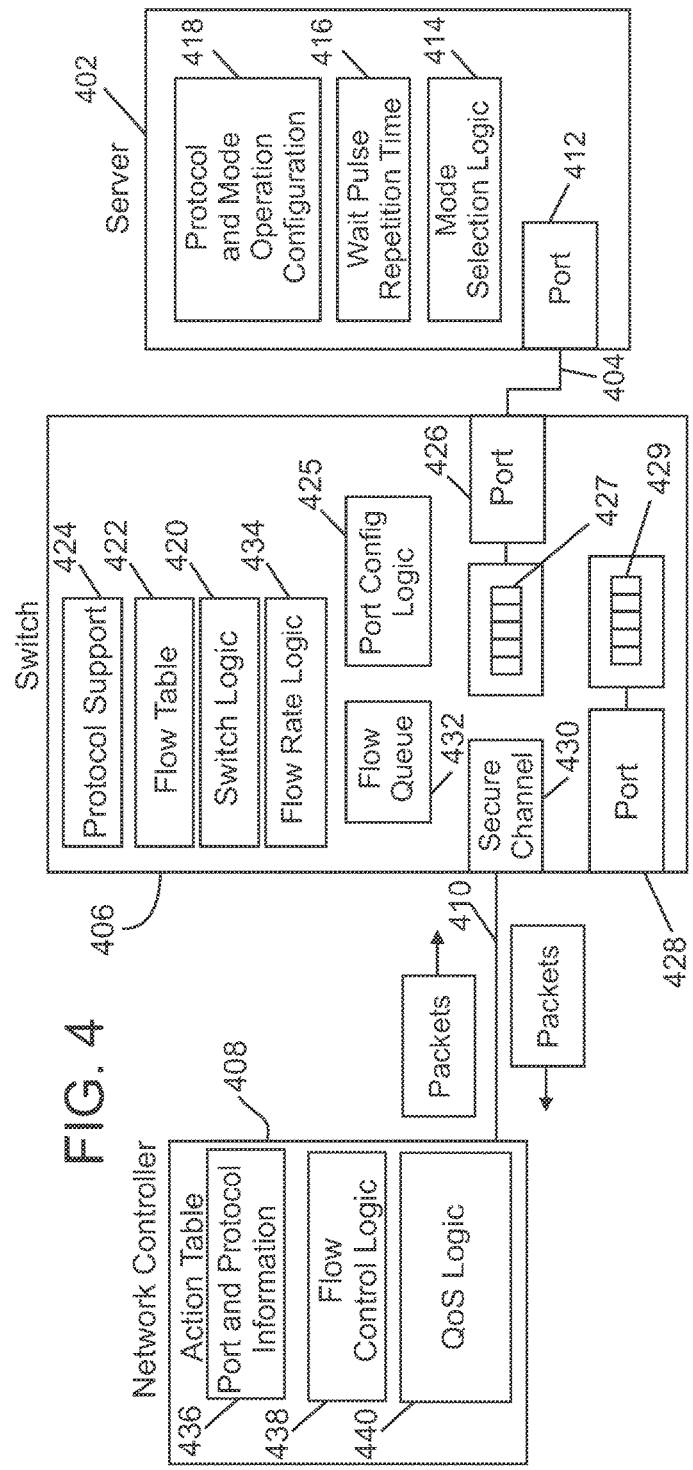
FIG. 4 depicts an exemplary embodiment of a portion of a network including a network switch and a switch controller.

FIG. 4 depicts a block diagram of a network portion 400. A server 402 is coupled by a link 404 to a switch 406. An exemplary server 402 is a server 102 of FIG. 1, and an exemplary switch 406 is a switch 106 of FIG. 1. A controller 408 (e.g., a network controller) is linked to the switch 406 by, e.g., a secure link 410. In one embodiment, in OpenFlow-capable environments, the controller is a network controller such as network controller 112 of FIG. 1. In other embodiments, for non-OpenFlow environments, functions of the controller 408 can be integrated into other network entities such as the server 402 or server 102.

As shown in FIG. 4, the switch 406 is connected to the server 402, which includes at least one port 412 and various logical components such as mode selection logic 414, wait pulse repetition time 416, and protocol and mode of operation configuration 418. Logical components described herein can be implemented in instructions stored in a computer readable storage medium for execution by a processing circuit or in hardware circuitry, and can be configured to send frames such as link initialization frames and data packets. The switch 406, server 402 and controller 408 may support a number of modes of operation including, but not limited to, Ethernet, Fibre Channel, Fibre Channel over Ethernet (FCoE), Internet Wide Area Remote direct memory access Protocol (iWARP), and Remote direct memory access over Converged Ethernet (RoCE).

The switch 406 includes switch logic 420, flow table 422, protocol support 424, port configuration and reset logic 425 and multiple ports, such as port 426 for communicating with the server 402 and port 428 for communicating with other network entities such as other switches or servers. The ports may be physical ports, virtual ports defined by the switch, and/or a virtual port defined by the OpenFlow protocol. Each port may be attached to one or more port queues 427 and 429. When implemented as an OpenFlow switch, the switch 406 also includes a secure channel 430 for communicating with the network controller 408 on secure link 410.

The switch also includes at least one flow control queue 432 configured to store flow control information such as a QoS policy that is associated with each individual data flow. The switch 406 receives the queue information from one or more data packets received as part of a specific data flow, and stores the flow control information in the flow queue 432. In the flow queue 432, the flow control information is associated with the specific flow. Multiple QoS policies for multiple flows may be stored in the flow control queue 432 (or other designated queue, virtual queue space or other data structure). An exemplary data packet in which the flow control information may be stored is described below in conjunction with FIG. 5.

Capability of the switch to receive and store the flow control information and control packet processing based on the flow information is embodied in suitable logic, such as flow rate logic 434. This capability may be embodied in any suitable manner, e.g., configured as part of switch logic 420.

Still referring to FIG. 4, the network controller 408 includes an action table 436 that holds port and protocol information for the switch 406, as well as rules, actions, and statistics for flows through the switch 406 and other switches, such as switches 106 of FIG. 1. The network controller 408 also includes flow control logic 438 that can be implemented in instructions stored in a computer readable storage medium for execution by a processing circuit or in hardware circuitry. The network controller 408 can manage updates of the flow table 422 in the switch 406. Based on the updating of the flow table 422, the port and protocol information in the action table 432 of the network controller 408 is updated to reflect the changes.

The network controller also include suitable logic, e.g., QoS logic 440, that allows the controller 408 to set flow control or QoS levels, monitor packet routing performance in the switch 406 and modify packet processing (e.g., dropping, rate-limiting or re-routing flows) according to pre-set QoS levels. The controller 408 may also be configured to configure and/or modify data packets to include the flow information therein, e.g., by inserting a tag in packet headers via a push action.

As indicated above, the network controller 408 communicates with the switch 406 via a secure link 410 established using a specified port, such as a port in a physical network controller 112 or a controller implemented in other processors, such as a server 102 or client system 104. The network controller 408 communicates with the switch 406 to configure and manage the switch, receive events from the switch and send packets out the switch. Various message types can be sent between the switch and the controller to accomplish such functions, including controller-to-switch, asynchronous and symmetric messages.

Controller-to-switch messages are initiated by the controller 408 and may or may not require a response from the switch 406. Features messages are used to request the capabilities of the switch 406 (e.g., upon establishment of the secure link), in response to which the switch 406 should return a features reply that specifies the capabilities of the switch 406. Configuration messages are sent by the controller 408 to set and query configuration parameters in the switch 406. The switch 406 only responds to a query from the controller 408. Modify-State messages are sent by the controller 408 to manage state on the switches, e.g., to add/delete and/or modify flows/groups in the flow table 422 and to set switch port properties. Read-State messages are used by the controller to collect statistics from the switch. Packet-out messages are used by the controller to send packets out of a specified port on the switch, and to forward packets received via Packet-in messages. Packet-out messages contain a full packet or a buffer ID referencing a packet stored in the switch. Packet-out messages also contain a list of actions to be applied in the order they are specified; an empty action list drops the packet.

Asynchronous messages are sent without the controller 408 soliciting them from the switch 406. The switch 406 sends asynchronous messages to the controller 408 to, e.g., denote a packet arrival, switch state change, or error. A packet-in event message may be sent to the controller 408 from the switch 406 for packets that do not have a matching flow entry, and may be sent from the controller 408 to the switch 406 for packets forwarded to the controller 408. Flow-removed messages are used to indicate that a flow entry has been removed due to, e.g., inactivity or expiration of the flow entry. Port-status messages are sent in response to changes in port configuration state and port status events. Error messages may be used by the switch 406 to notify the controller 408 of problems.

Symmetric messages are sent without solicitation, in either direction. Hello messages may be exchanged between the switch 406 and controller 408 upon connection startup. Echo request/reply messages can be sent from either the switch 406 or the controller 408, and can be used to measure the latency or bandwidth of a controller-switch connection, as well as verify its liveness. Experimenter messages provide a way for the switch 406 to offer additional functionality within the OpenFlow message type space.

Figure 5:
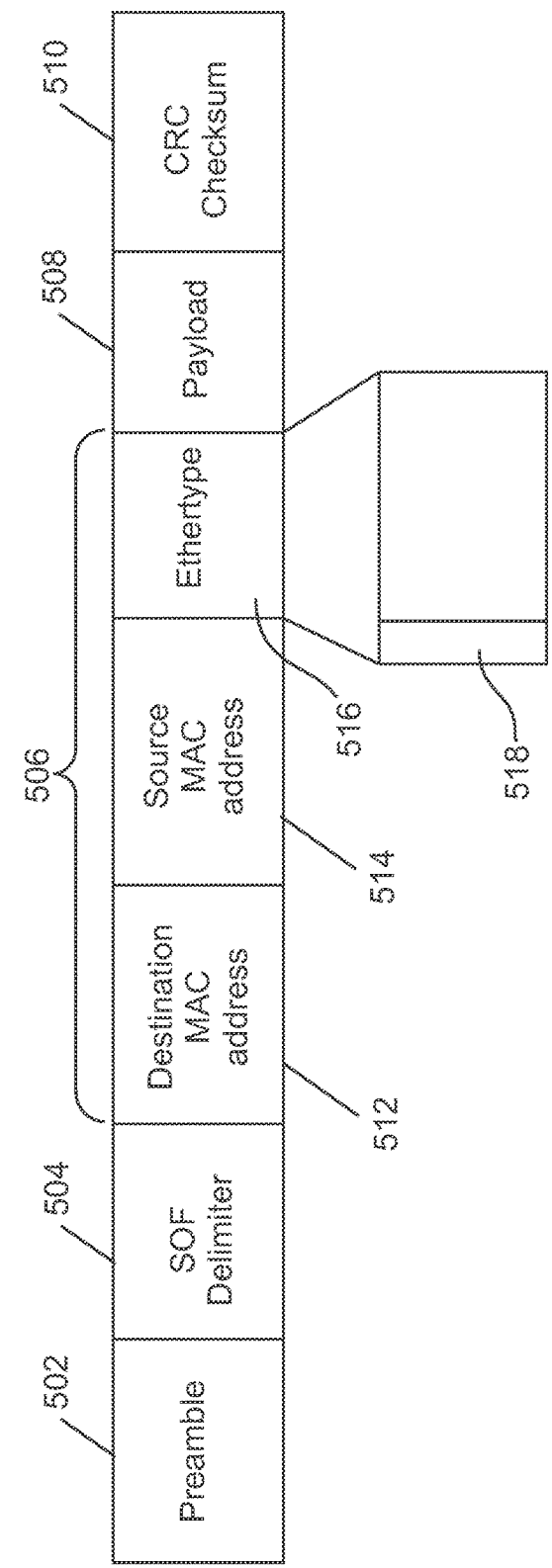
FIG. 5 depicts an example of a data packet.

FIG. 5 depicts an embodiment of a data frame or data packet 500. The data packet 500 includes a preamble 502, a start of frame (SOF) delimiter 504, a header 506, payload data 508 and a cyclic redundancy check (CRC) checksum 510. The header 506 includes network address information and protocol information. For example, the frame 500 includes a destination MAC address 512, a source MAC address 514 and an Ethernet type field 516.

In one embodiment, the frame 500 includes flow control or QoS information for the frame 500 and the corresponding data flow. The flow control information may be included in a field inserted in the data packet 50 or in an existing field. In one embodiment, the flow control information is included in the packet header 506. For example, the Ethertype field 516 includes a tag 518 that specifies a type or level of flow control associated with the data flow. A new delimiter may be added to indicate any additional bytes included for the flow control information.

An exemplary tag 518 includes a two-bit field indicating a level of QoS. In this example, four levels of QoS may be specified.

Other exemplary data packets include flow information added to a packet header, e.g., a IPv4 or IPv6 header. The information may be included by adding bits to the header or remapping bits in the header. For example, header fields such as source address (SA), destination address (DA) and type of service (TOS) fields can be set as match fields and include flow control information without requiring additional bits to be added to the header.

It is noted that not all of the data packets in a data flow need to be tagged with flow control information. In addition, specific data packets can be tagged with a different flow policy, e.g., latency sensitive messages can be tagged as exempt.

It is noted that the frame 500 and the header 506, and their respective fields, are not limited to the specific embodiments described herein. For example, the header 506 may include different or additional fields depending on protocols used. In one example, the header 506 may include any number of fields as described with reference to the switching definition 300.

Figure 6:
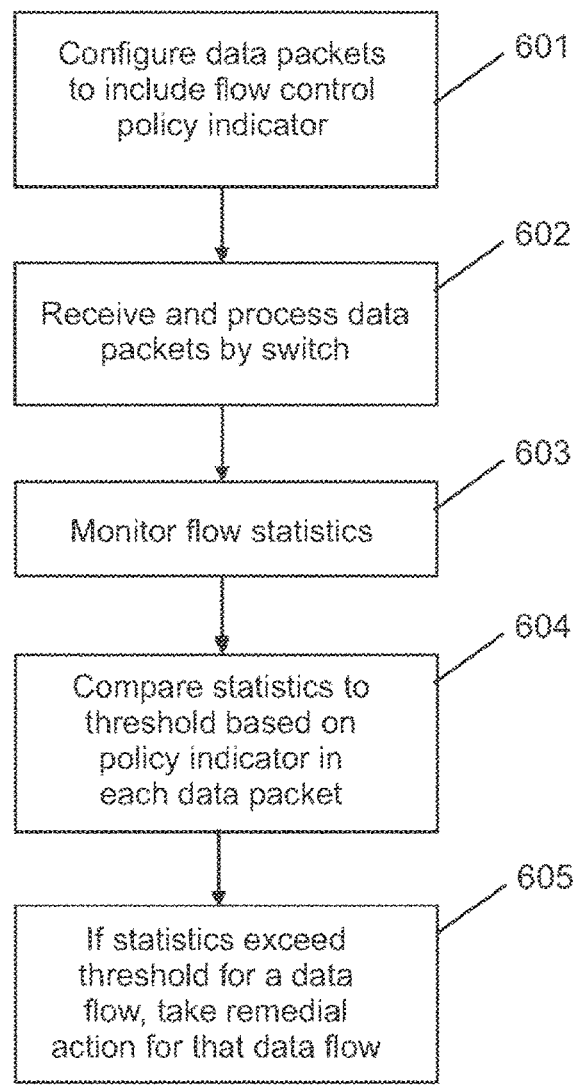
FIG. 6 is a flow diagram showing a method of monitoring and/or processing data flows in a network.

An embodiment of a method 600 of monitoring data transmission and/or processing data flows in a network is described with reference to FIG. 6. The method 600 is described in conjunction with the network portion 400 shown in FIG. 4, but is not so limited. In one embodiment, the method includes the steps represented by blocks 601-605 in the order described. However, in some embodiments, not all of the steps are performed and/or the steps are performed in a different order than that described.

At block 601, the controller 408 (or other processor originating a network operation) receives data to be transmitted through a network and generates or configures a group of data packets such as packets 500. The group of data packets 500 is referred to as a data flow. In one embodiment, the network is an OpenFlow capable network.

For example, each data packet 500 (or some subset of data packets 500 in the data flow) is configured to include flow control information such as QoS policy information. The flow control information may be included in any suitable part of the data packet 500, such as in a tag field 518.

An example of the flow control information includes a QoS policy having multiple QoS levels. Each QoS level corresponds to a level of service. Exemplary service levels include queue depth levels, bit rate or throughput levels in the switch 406 and/or in various port queues, latency and jitter. In some embodiments, specific latency sensitive messages may be tagged as exempt from the QoS policy.

A queue depth level refers to an amount or percentage of the queue depth that is filled, or the available queue depth. As described herein, "queue depth" refers to the maximum number of packets or maximum amount of data that a queue can hold before packets are dropped. Each QoS level can represent a different queue depth level.

Embodiments described herein include originating or configuring packets by the controller 408 at the beginning of the data flow, but are not so limited. For example, the switch 406 and/or controller 408 may receive data packets 500 from a source, and the controller 408 may configure each data packet 500 by inserting flow control information such as a QoS level into the packet header, e.g., by adding bits or reconfiguring an existing field.

At block 602, the switch 406 receives and processes the data packets. Processing includes matching the data packets and performing actions such as forwarding the data packets to appropriate ports. The controller 408 may perform various functions during operation of the switch. For example, the controller 408 manages switches 406 in a network by initializing switches, populating and/or modifying flow tables to manage flows, sending flows to various switches and communicating with switches in general.

At block 603, upon receiving each data packet, the switch 406 stores the QoS policy or other flow control information in the flow control queue 432 and the switch 406 and/or the controller 408 monitors flow statistics specified by the QoS policy. For example, the switch 406 and/or the controller 408 monitors port ingress and/or egress queues (e.g., queues 427 and 429) and determines statistics such as amount of queue depth filled, ingress rate and egress rate.

At block 604, the switch 406 and/or the controller 408 compares the monitored statistics to service level thresholds established by the QoS policy. For example, the switch 406 compares statistics such as the amount of queue filled, the ingress rate and/or the egress rate to a threshold defined by the QoS policy. For example, the two-bit tag 518 indicates a selected QoS level that is associated with a threshold. If the statistics exceed the threshold associated with that level, a congestion condition is detected. For example, a congestion condition may be backpressure on a specific data flow in the switch 406.

At block 605, if a congestion condition is detected for a particular data flow, the controller 408 takes remedial or corrective action specifically for that data flow. Exemplary remedial actions include rate-limiting the data flow, turning off the data flow in the switch, and re-routing the data flow. In one embodiment, the remedial action includes rate-limiting the data flow at the data flow's source by the controller 408. In another embodiment, the controller 408 throttles on or off specific flows in the switch 408 using the flow information stored in the flow control queue. For example, the controller 408 sends a controller-to-switch message to direct the switch 406 to turn off a specified data flow.

Technical effects include the ability to implement rate limiting in a network controller. In addition, the embodiments described herein allow for the monitoring and rate-limiting of specific data flows in a switch. Embodiments also allow a central controller to assign specific flow control levels to each data flow and monitor data flows in multiple switches according to flow control levels stored in the switches and assigned to each flow.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of monitoring data flow in a network, comprising:

configuring a data flow including a plurality of data packets by a switch controller, the data flow received from a source and configured to be routed through one or more switches in a network to a destination, the switch controller configured to control routing of the data flow through a network switch, wherein configuring includes associating the data flow with a quality of service (QoS) flow control policy selected from a plurality of QoS flow control policies, each QoS flow control policy associated with one of a plurality of pre-set flow control levels, and storing an indication of a selected pre-set flow control level in one or more of the data packets of the data flow, each pre-set flow control level defining a threshold value of a flow statistic, wherein a value of the flow statistic exceeding the threshold value is indicative of a congestion condition;

storing the selected QoS flow control policy in a flow control queue in the network switch that is separate from ingress and egress queues and from a flow table of the switch, the flow control queue associating the selected QoS flow control policy with the data flow, the flow control queue configured to associate one or more of the plurality of QoS flow control policies with each specific data flow received by the switch;

monitoring the network switch receiving the data flow, wherein monitoring includes determining the value of the flow statistic in the switch associated with the data flow;

determining whether a congestion condition exists for the data flow based on comparing the value of the flow statistic and the threshold value defined by the pre-set flow control level associated with the selected QoS flow control policy; and based on determining that the congestion condition exists for the data flow, performing a remedial action specific to the data flow to address the congestion condition.

2. The method of claim 1, wherein monitoring includes determining flow statistics for a plurality of data flows in the network switch.

3. The method of claim 2, wherein the remedial action is performed for one or more data flows whose flow statistics exceed the threshold.

4. The method of claim 1, wherein the flow statistic includes at least one of a queue depth statistic, an ingress queue flow rate and an egress queue flow rate.

5. The method of claim 1, wherein performing the remedial action includes at least one of rate-limiting the data flow, turning off the data flow in the switch, and re-routing the data flow.

6. The method of claim 1, wherein the indication of the selected pre-set flow control level is stored as data in a header of the one or more data packets.

7. A method of processing data flows in a network switch, comprising:

receiving a data flow at the network switch, the data flow including a plurality of data packets, the data flow received from a source and configured to be routed through one or more switches in a network to a destination, wherein one or more of the data packets includes an indication of a selected pre-set flow control level associated with a quality of service (QoS) flow control policy selected from a plurality of QoS flow control policies, each QoS flow control policy associated with one of a plurality of pre-set flow control levels, each pre-set flow control level defining a threshold value of a flow statistic, wherein a value of the flow statistic exceeding the threshold value is indicative of a congestion condition, the indication inserted into the one or more data packets by a switch controller;

storing the indication of the QoS flow control policy in a flow control queue in the network switch that is separate from ingress and egress queues and from a flow table of the switch, the flow control queue associating the selected QoS flow control policy with the data flow, the flow control queue configured to associate one or more of the plurality of QoS flow control policies with each specific data flow received by the switch; and processing the data flow at the network switch according to instructions associated with the data flow and configured by a switch controller.

8. The method of claim 7, further comprising, based on the switch controller determining that the specified flow statistic for the data flow exceeds the threshold, receiving an instruction to perform a remedial action on the data flow.

9. The method of claim 8, wherein the remedial action includes at least one of adjusting a flow rate of the data flow, re-routing the data flow, and turning off the data flow.

10. The method of claim 7, wherein storing includes extracting the indication of the selected QoS flow control policy from a header of the one or more data packets and storing the indication with an identification of the data flow.

11. The method of claim 7, wherein the flow control queue is configured to store a plurality of QoS flow control policy indications, each QoS flow control policy indication associated with an identification of a different data flow being processed in the network switch.

12. A computer program product for monitoring data flow in a network, the computer program product comprising:

a non-transitory tangible storage medium readable by a processing circuit and storing instructions for execution by the processing circuit for performing a method comprising:

configuring a data flow including a plurality of data packets by a switch controller, the data flow received from a source and configured to be routed through one or more switches in a network to a destination, the switch controller configured to control routing of the data flow through a network switch, wherein configuring includes associating the data flow with a quality of service (QoS) flow control policy selected from a plurality of QoS flow control policies, each QoS flow control policy associated with one of a plurality of pre-set flow control levels, and storing an indication of a selected pre-set flow control level in one or more of the data packets of the data flow, each pre-set flow control level defining a threshold value of a flow statistic, wherein a value of the flow statistic exceeding the threshold value is indicative of a congestion condition;

storing the selected QoS flow control policy in a flow control queue in the network switch that is separate from ingress and egress queues and from a flow table of the switch, the flow control queue associating the selected QoS flow control policy with the data flow, the flow control queue configured to associate one or more of the plurality of QoS flow control policies with each specific data flow received by the switch controller;

monitoring the network switch receiving the data flow, wherein monitoring includes determining the value of the flow statistic in the switch;

determining whether a congestion condition exists for the data flow based on comparing the value of the flow statistic and the threshold value defined by the pre-set flow control level associated with the selected QoS flow control policy; and based on determining that the congestion condition exists for the data flow, performing a remedial action specific to the data flow to address the congestion condition.

13. The computer program product of claim 12, wherein the flow control queue includes an indication of a QoS flow control policy specific to each data flow, the indication retrieved from data in a header of the one or more data packets.

14. The computer program product of claim 13, wherein the remedial action is performed for one or more data flows whose flow statistics exceed the threshold.

15. The computer program product of claim 12, wherein the network switch is an OpenFlow switch and the switch controller is an OpenFlow switch controller.

16. The computer program product of claim 12, wherein performing the remedial action includes at least one of rate-limiting the data flow, turning off the data flow in the switch, and re-routing the data flow.

17. A computer program product for processing data flows in a network switch, the computer program product comprising:

a non-transitory tangible storage medium readable by a processing circuit and storing instructions for execution by the processing circuit for performing a method comprising:

receiving a data flow at the network switch, the data flow including a plurality of data packets, the data flow received from a source and configured to be routed through one or more switches in a network to a destination, wherein one or more of the data packets includes an indication of a selected pre-set flow control level associated with a quality of service (QoS) flow control policy selected from a plurality of QoS flow control policies, each QoS flow control policy associated with one of a plurality of pre-set flow control levels, each pre-set flow control level defining a threshold value of a flow statistic, wherein a value of the flow statistic exceeding the threshold value is indicative of a congestion condition the indication inserted into the one or more data packets by a switch controller;

storing the indication of the QoS flow control policy in a flow control queue in the network switch that is separate from ingress and egress queues and from a flow table of the switch, the flow control queue associating the selected QoS flow control policy with the data flow, the flow control queue configured to associate one or more of the plurality of QoS flow control policies with each specific data flow received by the switch; and processing the data flow at the network switch according to instructions associated with the data flow and configured by a switch controller.

18. The computer program product of claim 17, further comprising, based on the switch controller determining that the specified flow statistic for the data flow exceeds the threshold, receiving an instruction to perform a remedial action on the data flow.

19. The computer program product of claim 18, wherein the remedial action includes at least one of adjusting a flow rate of the data flow, re-routing the data flow, and turning off the data flow.

20. The computer program product of claim 17, wherein each QoS flow control policy indication is associated with an identification of a different data flow being processed in the network switch.

21. An apparatus for controlling a network switch, comprising:

a memory having computer readable computer instructions; and a processor for executing the computer readable instructions, the instructions including:

configuring a data flow including a plurality of data packets by a switch controller, the data flow received from a source and configured to be routed through one or more switches in a network to a destination, the switch controller configured to control routing of the data flow through a network switch, wherein configuring includes associating the data flow with a quality of service (QoS) flow control policy selected from a plurality of QoS flow control policies, each QoS flow control policy associated with one of a plurality of pre-set flow control levels, and storing an indication of a selected pre-set flow control level in one or more of the data packets of the data flow, each pre-set flow control level defining a threshold value of a flow statistic, wherein a value of the flow statistic exceeding the threshold value is indicative of a congestion condition;

storing the selected QoS flow control policy in a flow control queue in the network switch that is separate from ingress and egress queues and from a flow table of the switch, the flow control queue associating the selected QoS flow control policy with the data flow, the flow control queue configured to associate one or more of the plurality of QoS flow control policies with each specific data flow received by the switch controller;

monitoring the network switch receiving the data flow, wherein monitoring includes determining the value of the flow statistics in the switch associated with the data flow;

determining whether a congestion condition exists for the data flow based on comparing the value of the flow statistic and the threshold value defined by the pre-set flow control level associated with the selected QoS flow control policy; and based on determining that the congestion condition exists for the data flow, performing a remedial action specific to the data flow to address the congestion condition.

22. The apparatus of claim 21, wherein the flow control queue includes an indication of a QoS flow control policy specific to each of the plurality of data flows.

23. The apparatus of claim 22, wherein the remedial action is performed for one or more data flows whose flow statistics exceed the threshold.

24. The apparatus of claim 21, wherein performing the remedial action includes at least one of rate-limiting the data flow, turning off the data flow in the switch, and re-routing the data flow.

* * * * *